Oct. 11, 1966
MASAO HORINO
3,278,921
MANUAL-AUTOMATIC SWITCH OF LIFE LAMP
Filed April 10, 1964
2 Sheets-Sheet 1
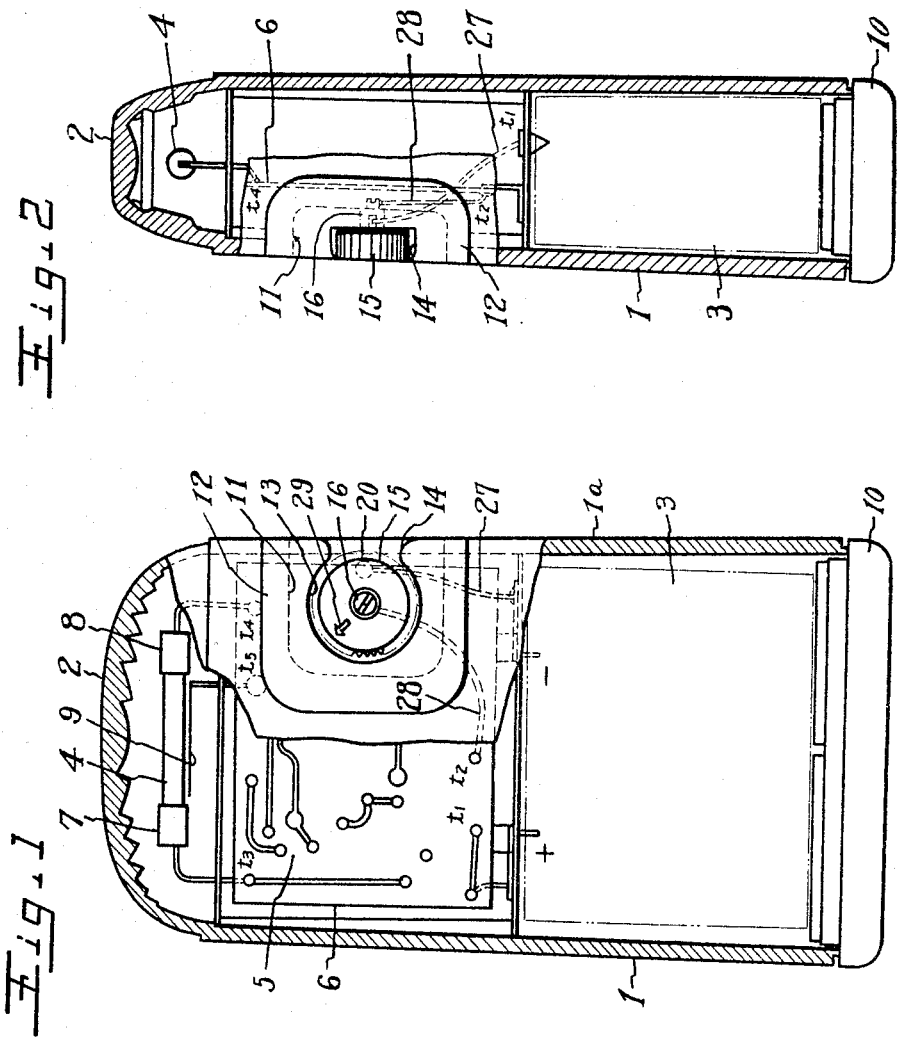
INVENTOR
MASAO HORINO

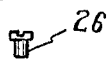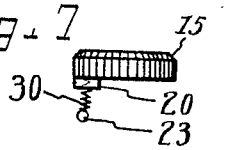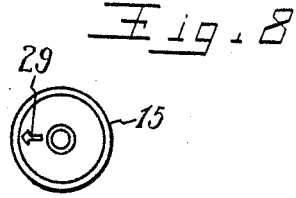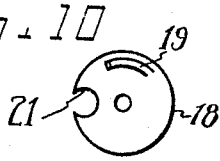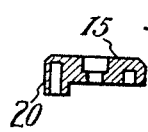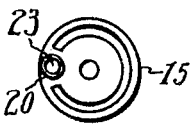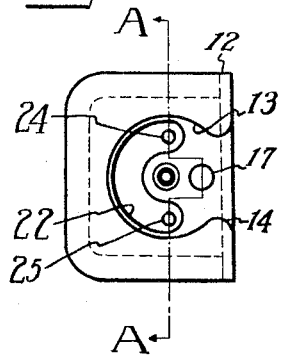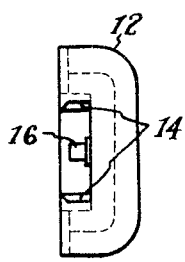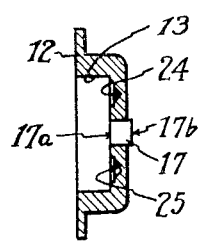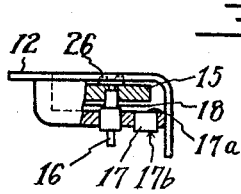

United States Patent Office 3,278,921
Patented Oct. 11, 1966

3,278,921
MANUAL-AUTOMATIC SWITCH OF LIFE LAMP
Masao Horino, 81 Nakane-cho, Meguro-ku,
Tokyo, Japan
Filed Apr. 10, 1964, Ser. No. 358,769
Claims priority, application Japan, Apr. 13, 1963,
38/19,237
4 Claims. (Cl. 340—235)

This invention relates to a life lamp suitable for use on the sea or the like in which power source is automatically connected to the device thereby to blink a discharge lamp enclosed therein when thrown into the sea in case of, for example, airplane accidents on the sea, and more particularly to a manual-automatic switch of such life lamp which is automatically switched on when thrown into the sea and can be operated manually from outside at other times, if necessary.

One object of this invention is to provide a manual-automatic switch of a life lamp suitable for use on the sea or the like such that when a watertight case having enclosed therein a battery, a discharge lamp connected thereto and a control circuit to blink the lamp at predetermined intervals when the assembly is thrown into the water. At such time the battery, the discharge lamp and the control circuit are electrically connected thereby immediately to start blinking of the discharge lamp.

Another object of this invention is to provide a manual-automatic switch of a life lamp suitable for use on the sea or the like such that a discharge lamp in a watertight case is switched on to start blinking manually from outside, if necessary, and when the case is thrown down into the water, with the discharge lamp switched off, a battery and a control circuit in the case are automatically conducted through water thereby to start blinking of the discharge lamp.

A further object of this invention is to provide a manual-automatic switch which is simple in structure and accurately operates when thrown into the water.

Other objects, features and advantages of this invention will become apparent from the following description taken in conjunction with the accompanying drawings, in which:

FIGURE 1 is a front view of the life lamp of this invention, with one portion of its case shown in cross section;

FIGURE 2 is its side view;

FIGURE 3 is a front view of the manual-automatic switch portion of the life lamp of this invention, having left out a knob;

FIGURE 4 is a side view of the switch portion, having left out one portion thereof;

FIGURE 5 is a cross-sectional view taken on the line A—A in FIGURE 3;

FIGURE 6 is a partial view of the switch portion shown in FIGURE 3, with one portion thereof seen from beneath in cross section;

FIGURE 7 is a side view of the knob to be employed in the device of this invention;

FIGURE 8 is its front view;

FIGURE 9 is a cross-sectional view of the knob;

FIGURE 10 is a front view of an electrode plate;

FIGURE 11 is a side view of the electrode plate;

FIGURE 12 is a back view of the knob; and

FIGURE 13 is a front view of a screw securing the knob.

Referring now to the drawings, 1 is a case which may preferably be made of a plastic material such as synthetic resin or the like and it is preferable to provide at the top end of the case a lens 2 formed of transparent plastic. Inside the case, there are disposed a gas discharge tube 4 having xenon gas or the like sealed therein, a battery 3 and a control circuit 5 connected to the battery to blink the discharge lamp 4 at a predetermined time interval. This circuit is arranged on, for example an insulating base 6 as shown in FIGURE 1. The control circuit has input terminals $t_1$ and $t_2$ connected respectively to the plus and minus sides of the battery 3, output terminals $t_3$ and $t_4$ connected to main electrodes 7 and 8 of the discharge lamp 4 and a terminal $t_5$ connected to a control electrode 9 of the discharge lamp. In short, any circuit suffices so long as it receives D.C. voltage from the battery and applies discharge voltage to the anode of the discharge lamp and trigger pulse to the control electrode thereby to blink the discharge lamp 4 at a predetermined time interval. After such parts have been enclosed in the case 1, the case is sealed watertight at the bottom thereof with a lid 10.

In the present invention the device is constructed in a manner such that when it is thrown into the water the battery is automatically connected to the control circuit, and this invention is to provide a novel structure and disposition of such device. At first a window 11 is provided on the case 1 and a manual-automatic switch of this invention is mounted on an L-shaped piece, namely a lid piece 12 to be fitted in the window.

The structure of switch is illustrated in detail in FIGURES 3 to 13. That is, the window 11 is provided on the case over the front and side thereof as illustrated in FIGURES 1 and 2, and the switch portion of the present invention is mounted on the lid piece which covers up the window. On the lid piece 12, there is provided substantially a circular concave portion 13 which has an opening 14 on the side 1a of the case 1. A knob 15 is mounted in the concave portion 13, and can be rotated with a finger tip from the opening 14, to turn on and off the switch manually. The lid piece 12 is provided with a conductive shaft 16 passing through the piece itself substantially at the center thereof and another conductive member 17 also passing through the piece 12 in parallel to the shaft 16, as illustrated in FIGURES 3 to 5. The outer side of the conductive member 17 is exposed to the surface of the concave portion. The knob 15 is screwed down to the conductive shaft 16 and an electrode plate 18 is attached to the back of the knob 15, which plate is confronted with the exposed surface of the conductive member 17 at a little distance away therefrom. On the inside of the electrode plate 18, there is provided a resilient contact portion 19, which is moved in contact with the exposed surface 17a of the conductive member 17. Provided near the margin on the back of the knob 15 is a projection 20, which is projected downwards through a hole 21 of the electrode plate 18 and is turned along a circular groove 22 formed along the circumference of the concave portion 13 of the lid piece 12. On the projection 20, a center hole is bored and a ball 23 is put in the hole. That is, the ball is transported held between the projection 20 and the circular groove 22, thereby smoothing rotation of the knob 15. At the both ends of the circular groove 22, there are provided small holes 24 and 25 which are deeper than the circular groove, and the ball 23 is received and stopped at the holes to prevent the ball from running further, and the "on" and "off" positions of the switch, in case of being operated by hands, are determined at this point.

When assembling the aforementioned parts, the electrode plate 18 such as shown in FIGURE 10 is mounted on the back of the knob as illustrated in FIGURE 12 and in this case the projection 20 is put into the hole 21. Then, they are mounted on the conductive shaft 16 planted at the center of the concave portion 13 and fastened firmly from above with the screw 26 as shown in FIGURE 13. At this time the ball 23 is put in the hole of the projection 20 and the lower end of the ball is contacted with the circular groove 22. Thus, a lead 27 such as shown in FIGURE 1 is connected to an end 17b of the conductive member 17 exposed to the back of the lid piece 12 to connect the member to, for example the minus electrode of the battery 3. To the inner end of the shaft 16 positioned at the center of the lid, a lead 28 is connected as shown in FIGURE 1 to connect the shaft to the terminal $t_2$. Then the lid piece equipped with the respective parts is fitted watertight in the window 11 of the case 1.

In the present invention described above, at whatever position the knob may be positioned, the electrode plate 18 always confronts the exposed surface 17a of the conductive member 17 to slightly space them apart as described above. Accordingly, in such a case the power source circuit is formed from the plus side of the battery to the terminal $t_1$, thence to the terminal $t_2$ through the control circuit 5, thence to the inner end of the conductive shaft 16 through the lead 28, thence to the electrode plate 18 through the shaft 16. The electrode plate 16 confronts the exposed surface 17a of the conductive member 17 at a slight distance therefrom, and the inner end of the conductive member 17 is connected to the minus electrode of the battery 3 through the lead 27. The inside of the case is maintained completely watertight, but when it is thrown into the sea, for example, salt water conducts between the exposed surface 17a of the conductive member and the confronting surface of the electrode plate 16. As a result of this, the aforementioned circuit is closed thereby to connect the both electrodes of the battery to the terminals $t_1$ and $t_2$ and the control circuit 5 begins automatically to operate to blink the discharge tube at a predetermined time interval. In order to switch on the device without throwing it into the sea, the knob 15 is turned with a finger tip to contact the resilient contact portion 19 with the exposed surface 17a of the conductive member 17. In such a case, the circuit 5 is closed similar to the foregoing and the discharge tube blinks. On the surface of the knob 15, an arrow 29 is provided and it is convenient to indicate whether the device has been switched on manually in accordance with the position of the arrow. When the arrow is placed at a position other than the aforementioned one, for example at the opposite position, the device can be automatically operated by throwing it into water, as explained previously.

According to the present invention, when the case having watertight sealed therein the discharge lamp, battery and control circuit for blinking the lamp is thrown into the water, the water functions as a conductor accurately to connect the battery to the control circuit from outside. Otherwise, the discharge tube can similarly be switched on and off manually from outside by rotating the knob at any time. Accordingly, even if a crew or a passenger carrying a life lamp enclosed in the watertight case of this invention is thrown out into the water unconscious, for example, in an airplane accident, the device automatically operates to indicate where he was thrown out into the water. For instance, when a xenon lamp is used as the discharge lamp its light reaches a long way off, so that the light can easily be seen by a search plane or a search ship. Furthermore, in the present invention the device can be switched on and off manually only by turning the knob from outside independently of the automatic operation, and hence the discharge tube blinking operation can similarly be effected at any time as well as in the water. Furthermore, the device can be formed small in size and its operation can be simplified. Thus, the present invention has such remarkable advantages, as compared with this kind of devices of the prior art.

It will be apparent that many modifications and variations may be effected without departing from the scope of the novel concept of this invention.

What is claimed is:

1. A manual-automatic switch of a life lamp comprising a case having enclosed therein a battery, a discharge tube and a control circuit connected to said battery to blink the discharge tube at a predetermined time interval, a lid sealing watertight the marginal edge of said case, a conductive member passing through the wall of said case, the inner end of said member being connected to an electric circuit enclosed in the case, a conductive shaft passing through said case, the inner end of said shaft being also connected to the circuit, adjusting means for turning said conductive shaft, and an electrode plate attached electrically and mechanically to said conductive shaft and confronting at a little distance a portion of said conductive member exposed to the outside of the case, said electrode plate having a resilient contact portion on the back thereof, said contact portion making contact with the exposed portion of said conductive member in accordance with the position of said adjusting means, the gap between the electrode plate contacting with said conductive member and the exposed portion of said conductive member being so selected as to be conductive through water to switch on the electric circuit enclosed in the case.

2. A manual-automatic switch of a life lamp comprising a case having enclosed therein a battery, a discharge tube and a control circuit connected to said battery to blink the discharge tube at a predetermined time interval, a lid sealing watertight the marginal edge of said case, a conductive member passing through the wall of said case, the inner end of said member being connected to conducting circuit of said battery enclosed in the case, a conductive shaft passing through said case, the inner end of said shaft being also connected to the conducting circuit of said battery, a knob mounted on said conductive shaft on the outside of the case, an electrode plate attached to the back of said knob and confronting at a little distance a portion of said conductive member exposed to the outside of the case, said electrode plate having a resilient contact portion on the back thereof, said contact portion getting into contact with the exposed portion of said conductive member in accordance with the position of said knob, the gap between the electrode plate contacting with said conductive member and the exposed portion of said conductive member being so selected as to be conductive through water to switch on the electric circuit enclosed in the case, said knob having on the inside thereof a projection with a hole bored therein, said projection projecting out through said electrode plate, a circular groove formed on said case at a place confronting with said electrode plate, and a ball positioned between said circular groove and said projection.

3. A manual-automatic switch of a life lamp comprising a case having enclosed therein a battery, a discharge tube and control circuit connected to said battery to blink the discharge tube at a predetermined time interval, a lid sealing watertight the marginal edge of said case, a conductive member passing through the wall of said case, the inner end of said member being connected to the conducting circuit of said battery enclosed in the case, a conductive shaft passing through said case, the inner end of said shaft being also connected to the conducting circuit of said battery, a knob mounted on said conductive shaft on the outside of the case, an electrode plate attached to the back of said knob and confronting at a little distance a portion of said conductive member exposed to the outside of the case, said electrode plate having a resilient contact portion on the back thereof, said contact portion getting into contact with the exposed portion of said conductive member in accordance with the position of said knob, the gap between the electrode plate contacting with said conductive member and the exposed portion of said conductive member being so selected as to be conductive through water to switch on the electric circuit enclosed in the case, said knob having on the inside thereof a projection with a hole bored therein, said projection projecting out through said electrode plate, a circular groove formed on said case at a place confronting with said electrode plate, and a ball positioned between said circular groove and said projection.

4. A manual-automatic switch of a life lamp comprising a case having enclosed therein a battery, a discharge tube and a control circuit connected to said battery to blink the discharge tube at a predetermined time interval, a lid sealing watertight the marginal edge of said case, a conductive member passing through the wall of said case, the inner end of said member being connected to the conducting circuit of said battery enclosed in the case, a conductive shaft passing through said case, the inner end of said shaft being also connected to the conducting circuit of said battery, a knob mounted on said conductive shaft on the outside of the case, an electrode plate attached to the back of said knob and confronting at a little distance a portion of said conductive member exposed to the outside of the case, said electrode plate having a resilient contact portion on the back thereof, said contact portion getting into contact with the exposed portion of said conductive member in accordance with the position of said knob, the gap between the electrode plate contacting with said conductive member and the exposed portion of said conductive member being so selected as to be conductive through water to switch on the electric circuit enclosed in the case, said knob having on the inside thereof a projection with a hole bored therein, said projection projecting out through said electrode plate, a circular groove formed on said case at a place confronting with said electrode plate, small holes formed at the respective ends of said circular groove, and a ball fitted in the hole of said projection and so arranged as to contact with said circular groove.

No references cited.

NEIL C. READ, *Primary Examiner.*

R. M. ANGUS, D. J. YUSKO, *Assistant Examiners.*